United States Patent
Xu et al.

(10) Patent No.: US 11,742,496 B2
(45) Date of Patent: Aug. 29, 2023

(54) BIPOLAR PLATE FOR FUEL CELL

(71) Applicant: FORD GLOBAL TECHNOLOGIES, LLC, Dearborn, MI (US)

(72) Inventors: Chunchuan Xu, Troy, MI (US); Zijie Lu, Novi, MI (US); Jun Yang, Bloomfield Hills, MI (US); Daniel E. Wilkosz, Saline, MI (US); Shinichi Hirano, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 898 days.

(21) Appl. No.: 16/517,050

(22) Filed: Jul. 19, 2019

(65) Prior Publication Data

US 2021/0020962 A1    Jan. 21, 2021

(51) Int. Cl.
*H01M 8/0265* (2016.01)
*H01M 8/0254* (2016.01)
(Continued)

(52) U.S. Cl.
CPC ....... *H01M 8/0265* (2013.01); *H01M 8/0206* (2013.01); *H01M 8/0213* (2013.01); *H01M 8/0223* (2013.01); *H01M 8/0254* (2013.01); *H01M 8/0258* (2013.01); *H01M 8/0267* (2013.01); *Y02E 60/50* (2013.01)

(58) Field of Classification Search
CPC ............. H01M 8/0265; H01M 8/0254; H01M 8/0223; H01M 8/0206; H01M 8/0258; H01M 8/0267; H01M 8/0213; H01M 2008/1095; Y02E 60/50
See application file for complete search history.

(56) References Cited

U.S. PATENT DOCUMENTS 6,649,297 B1    11/2003   Marchand et al.
2005/0095485 A1*  5/2005   Saulsbury ........... H01M 8/0247
                                                    429/433
(Continued)

FOREIGN PATENT DOCUMENTS

WO         2018121910         7/2018

OTHER PUBLICATIONS

Baik et el. "Metallic bipolar plate with a multi-hole structure in the rib regions for polymer electrolyte membrane fuel cells" Applied energy 212 (2018), 333-339 (Year: 2018).*

(Continued)

*Primary Examiner* — Alexander Usyatinsky
(74) *Attorney, Agent, or Firm* — David B Kelley; Brooks Kushman P.C.

(57) ABSTRACT

A bipolar plate for a fuel cell includes an anode plate and a cathode plate. The anode plate has hydrogen flow channels on a first side of the anode plate and coolant channels on a second side of the anode plate. The cathode plate has a first side disposed against the second side of the anode plate to cover the coolant channels and has a second side defining a recessed pocket configured to receive a stream of air. A flow guide is disposed in the pocket such that an inlet manifold is formed along a first edge of the flow guide and an outlet manifold is formed along a second edge of the flow guide. The flow guide defines channels extending from the inlet manifold to the outlet manifold. A plurality of openings is defined by through the flow guide.

12 Claims, 8 Drawing Sheets

(51) Int. Cl.
*H01M 8/0213* (2016.01)
*H01M 8/0206* (2016.01)
*H01M 8/0258* (2016.01)
*H01M 8/0223* (2016.01)
*H01M 8/0267* (2016.01)

(56) References Cited

U.S. PATENT DOCUMENTS

| | | | | |
|---|---|---|---|---|
| 2005/0118485 A1* | 6/2005 | Tawfik | ................. | H01M 8/021 |
| | | | | 429/511 |
| 2005/0136317 A1* | 6/2005 | Ferguson | ............ | H01M 8/0273 |
| | | | | 429/514 |
| 2006/0204825 A1* | 9/2006 | Mazza | ................. | H01M 8/021 |
| | | | | 429/514 |
| 2008/0038619 A1 | 2/2008 | Takagi et al. | | |
| 2008/0107952 A1* | 5/2008 | Farrington | ........ | H01M 8/04089 |
| | | | | 429/514 |
| 2012/0003560 A1* | 1/2012 | Meyers | ............. | H01M 8/04276 |
| | | | | 429/514 |
| 2012/0094203 A1* | 4/2012 | Kumar | .................. | H01M 8/026 |
| | | | | 429/457 |
| 2014/0329168 A1* | 11/2014 | Dang | .................. | H01M 8/0228 |
| | | | | 429/492 |
| 2014/0356747 A1* | 12/2014 | Gao | .................... | H01M 8/0267 |
| | | | | 429/434 |
| 2016/0372765 A1* | 12/2016 | Jones | ................ | H01M 8/04089 |
| 2018/0145346 A1 | 5/2018 | Jung et al. | | |

OTHER PUBLICATIONS

Baik, Kyung Don, and Il Sung Seo. "Metallic bipolar plate with a multi-hole structure in the rib regions for polymer electrolyte membrane fuel cells." Applied energy 212 (2018): 333-339.

* cited by examiner

US 11,742,496 B2

BIPOLAR PLATE FOR FUEL CELL

TECHNICAL FIELD

The present disclosure relates to fuel cells for automotive vehicles and more specifically to flow-field designs of bipolar plates.

BACKGROUND

The hydrogen fuel cell, and in particular the proton exchange membrane fuel cell (PEMFC), is one potential power source for automobiles and stationary applications. The reaction in a PEMFC involves hydrogen molecules splitting into hydrogen ions and electrons at the anode, while protons re-combine with oxygen and electrons to form water and release heat at the cathode. Typically, a proton exchange membrane is used as a proton conductor in a PEMFC. A catalyst layer containing, for example, platinum and/or a platinum alloy is used to catalyze the electrode reactions. A gas diffusion layer, which may include a microporous layer and a gas diffusion backing layer, is used to transport reactant gases and electrons as well as remove product water and heat.

SUMMARY

According to one embodiment, a bipolar plate for a Fuel cell includes an anode plate and a cathode plate. The anode plate has hydrogen flow channels on a first side of the anode plate and coolant channels on a second side of the anode plate. The cathode plate has a first side disposed against the second side of the anode plate to cover the coolant channels and has a second side defining a recessed pocket configured to receive a stream of air. A flow guide is disposed in the pocket such that an inlet manifold is formed along a first edge of the flow guide and an outlet manifold is formed along a second edge of the flow guide. The flow guide defines channels extending from the inlet manifold to the outlet manifold. A plurality of openings is defined by through the flow guide.

According to another embodiment, a bipolar plate for a fuel cell includes an anode side having hydrogen channels and a cathode side defining a recessed pocket. Coolant channels are disposed between the anode side and the cathode side. At least one air port is in fluid communication with the pocket, A flow guide is disposed in the pocket such that an inlet manifold is formed along a first edge of the flow guide and an outlet manifold is formed along a second edge of the flow guide. The flow guide defines channels extending from the inlet manifold to the outlet manifold. A plurality of openings is defined through the flow guide.

According to yet another embodiment, a fuel cell includes a plurality of unit cells disposed in a stack. Each unit cell includes a membrane electrode assembly (MEA) having an anode and a cathode, a bipolar plate, and a flow guide. The bipolar plate has a cathode side defining a recessed pocket in fluid communication with an air port, an anode side, and coolant channels between the cathode and anode sides. The bipolar plate is disposed against the MEA such that the cathode is disposed over the pocket. The flow guide is disposed in the pocket with a front side facing the MEA and a back side facing a bottom of the pocket. The flow guide includes a plurality of embossments.

DETAILED DESCRIPTION

Figure 1:
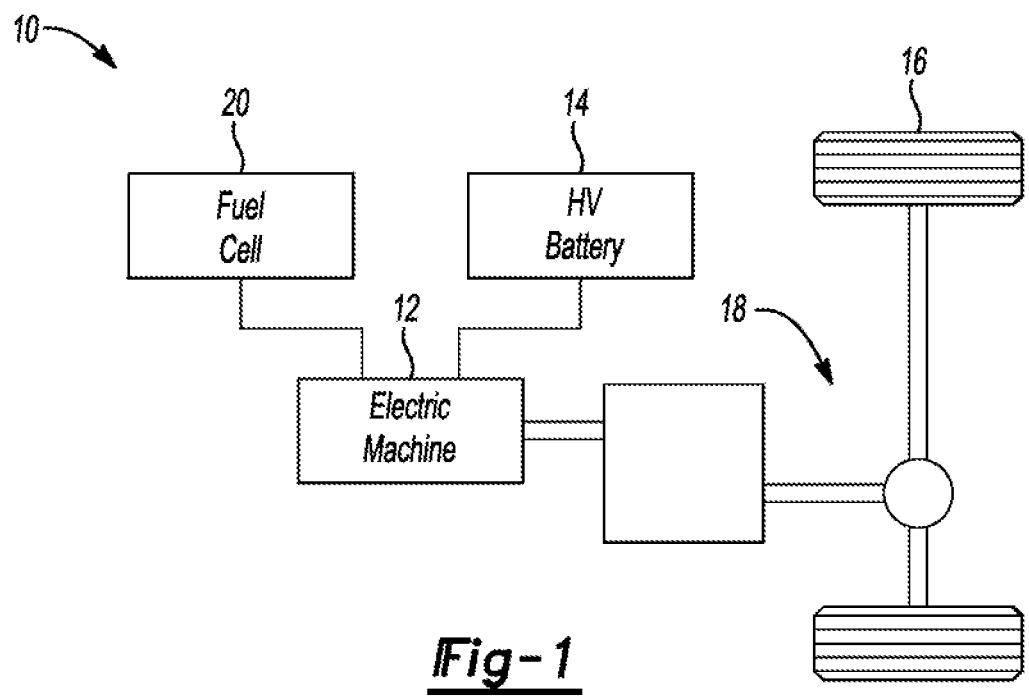
FIG. 1 is a schematic of a fuel-cell vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

PEMFC are a popular fuel cell choice for automotive vehicles. The PEMFC generally includes a proton exchange membrane (PEM). The anode and the cathode typically include finely divided catalytic particles, usually platinum, supported on carbon particles and mixed with an ionomer. The catalytic mixture is deposited on opposing sides of the membrane. The combination of the anode-catalytic mixture, the cathode-catalytic mixture, and the PEM form a coated catalyst membrane electrode (CCM). In order to facilitate the transport of reactant gases to and remove the excessive water and heat from the catalytic mixture, a gas diffusion layer (GDL), which may include a microporous layer and a carbon-fiber-based gas diffusion backing layer, may be applied on either side of the CCM to form a membrane electrode assembly (MEA). GDLs also provide mechanical support for the soft goods including the PEM and catalytic mixtures.

MEAs are sandwiched between bipolar plates to form unit cells. The bipolar plates typically include an anode side and a cathode side. Anode fuel flow channels are provided on the anode side of the bipolar plates that allow the anode gas to flow to the anode side of the MEA. Cathode oxidant flow channels are provided on the cathode side of the bipolar plates that allow the cathode gas to flow to the cathode side of the MEA. Coolant channels may be disposed between the anode and cathode sides of the bipolar plates to thermally regulate the fuel cell.

Several unit cells are typically combined in a fuel cell stack to generate the desired power. For example, the stack may include two-hundred or more unit cells arranged in series. The fuel cell stack receives a cathode reacting gas, typically a flow of air forced through the stack by a compressor. Not all the oxygen is consumed by the stack and some of the air is output as a cathode exhaust gas that may include water as a stack byproduct. The fuel cell stack also receives an anode hydrogen reacting gas that flows into the anode side of the stack.

Referring to FIG. 1, a vehicle 10 includes a fuel cell 20 for providing electrical power to at least one electric machine 12. The vehicle 10 may also include a traction battery 14 electrically connected to the fuel cell 20 and the electric machine 12. The electric machine 12 is connected to the driven wheels 16 via a drivetrain 18. During operation of the vehicle 10, hydrogen fuel and air are fed into the fuel cell 20 creating electrical power. The electric machine 12 receives the electrical power as an input, and outputs torque for driving the wheels 16 to propel the vehicle 10.

Figure 2:
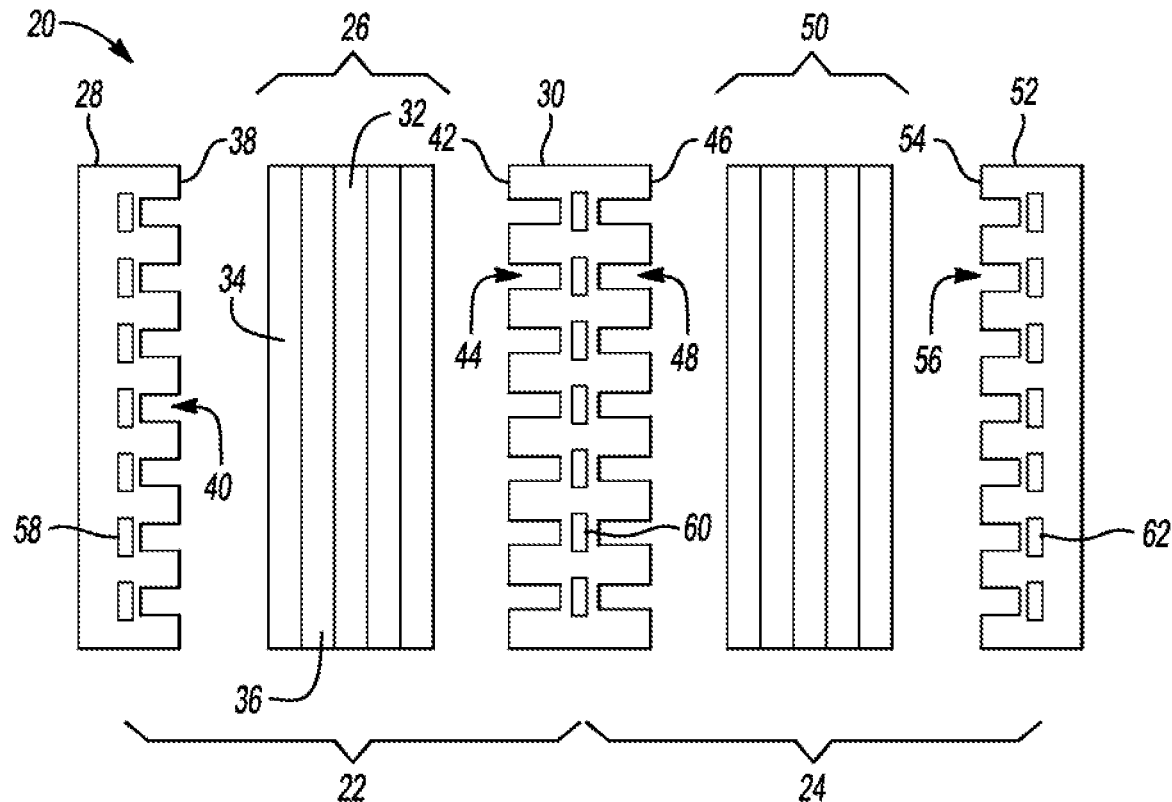
FIG. 2 is an exploded view of a proton exchange membrane fuel cell stack.

Referring to FIG. 2, an example fuel cell 20 includes two unit cells 22, 24 stacked together. The two-cell stack is merely an example and the fuel cell 20 may include dozens or hundreds of stacked unit cells. The first unit cell 22 includes an MEA 26 sandwiched between a first end plate 28 and a bipolar plate 30. The MEA 26 is comprised of a plurality of different layers including a PEM 32, a pair of gas diffusion layers (GDL) 34 and a pair of catalyst layers 36. The endplate 28 includes an anode side 38 defining a plurality of flow paths 40 for the hydrogen fuel. The bipolar plate 30 includes a cathode side 42 defining a plurality of flow paths 44 for air and an anode side 46 defining a plurality of flow paths 48 for hydrogen fuel for the second unit cell 24. A second MEA 50 is sandwiched between the bipolar plate 30 and a last endplate 52. The last endplate 52 includes a cathode side 54 defining a plurality of flow paths 56 for air. The coolant channels 58, 60, 62 are configured to circulate coolant, such as ethylene glycol.

Figure 3:
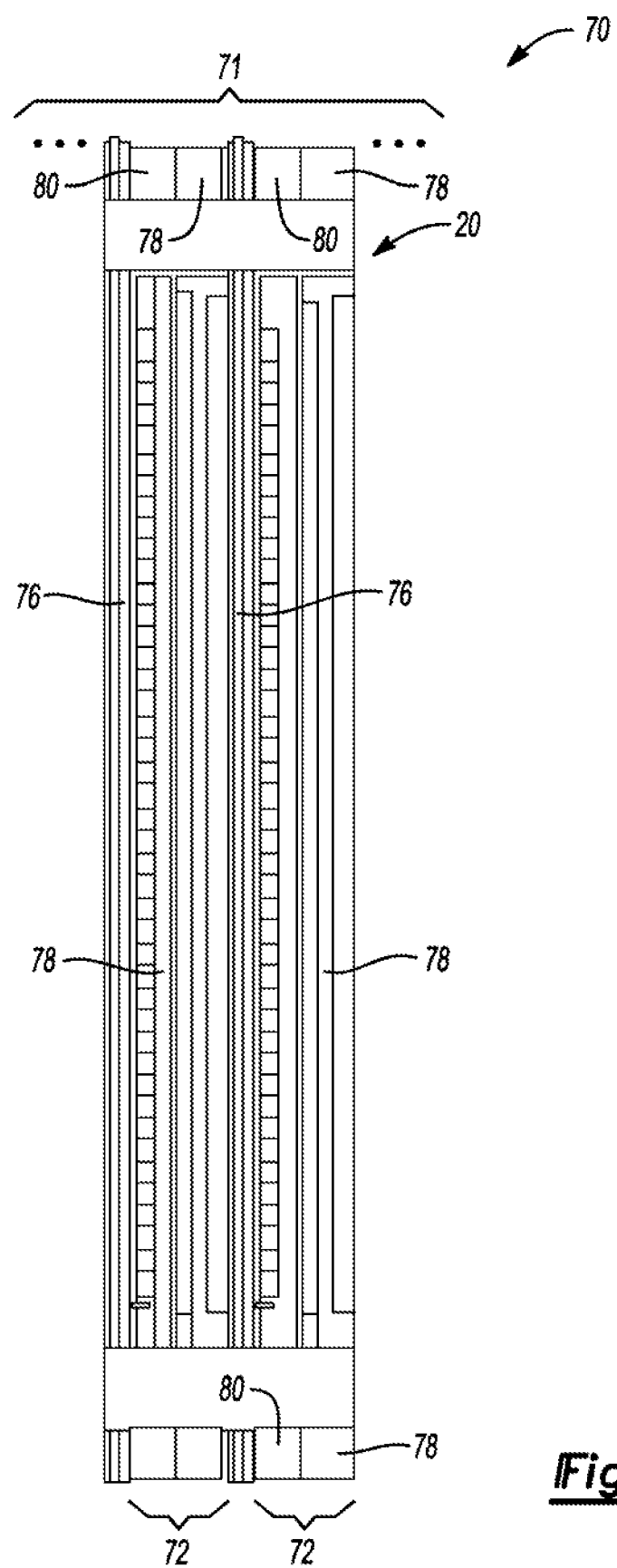
FIG. 3 is a side cross-sectional view of a portion of a fuel cell stack showing two unit cells.

Referring to FIG. 3, a fuel cell 70 includes a repeating pattern of unit cells 72 that are linearly arranged a stack 71. Most unit cell includes a bipolar plate 74 and an MEA 76. The unit cells at the ends of the stack may include end plates rather than bipolar plates. FIG. 3 illustrates two unit cells, but in practice, the fuel cell stack 70 may include dozens or hundreds of unit cells 72.

Each bipolar plate 74 may include one or more subassemblies of plates. In the illustrated embodiment, each bipolar plate 74 includes an anode plate 78 and a cathode plate 80. But, in other embodiments, the anode plate 78 and the cathode plate 80 may be portions of a singular structure. As illustrated, the unit cells 70 are the anode plate 78 adjacent to the cathode plate 80, then the MEA. 76 adjacent to the cathode plate 80, repeat.

Figure 4A:
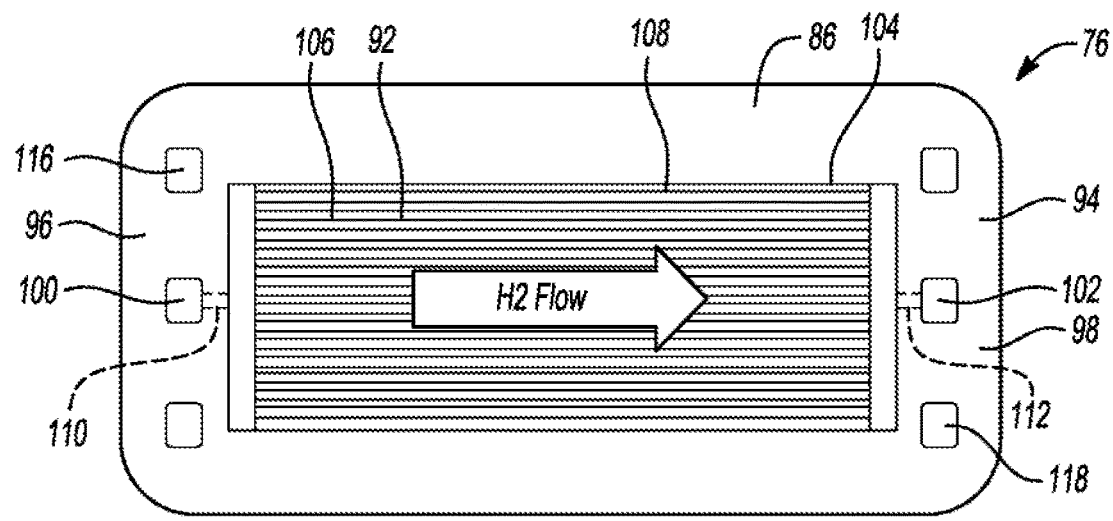
FIG. 4a is a front view of an anode plate showing the hydrogen flow side.
Figure 4B:
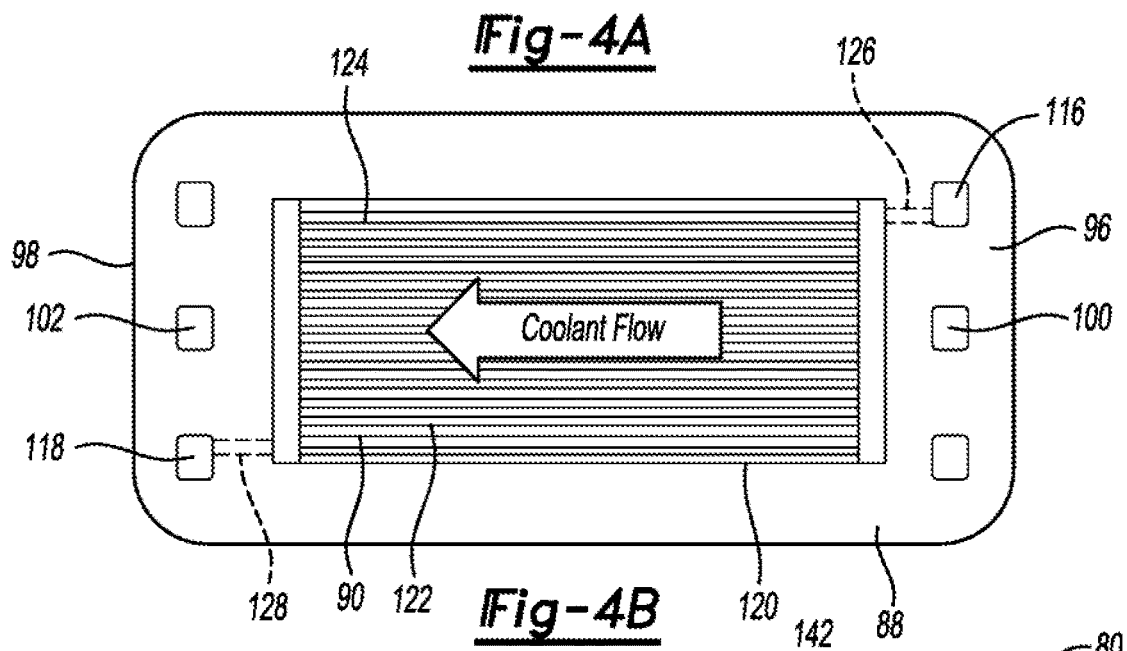
FIG. 4b is a back view of an anode plate showing the coolant flow side.

Referring to FIGS. 4A and 4B, the anode plate 76 may include a front side 86 and a hack side 88. The front side 86 is disposed against the MEA 76 and the hack side 88 is disposed against the cathode plate 80. A coolant flow field 90 may be provided on the hack side 88 and a hydrogen flow field 92 may be provided on the front side 86. The anode plate 78 includes an outer frame 94 that is outside of the reactant area of the fuel cell, whereas the coolant and hydrogen flow fields 90, 92 are within the reactant area.

The outer frame 94 may include opposing sides 96 and 98 that define a plurality of ports for the coolant, the hydrogen, and the air. For example, a hydrogen supply port 100 is defined in the side 96, and a hydrogen return port 102 is defined in the side 98. The hydrogen flow field 92 receives hydrogen from the supply port 100, circulates the hydrogen across the MEA 76, and returns excess hydrogen to the return port 102. The hydrogen flow field 92 may include a plurality of channels oriented to extend from the side 96 to the side 98. The channels may be defined in the anode plate or may be formed on a flow guide. In the illustrated embodiment, the front side 86 defines a front pocket 104 configured to receive a flow guide 106 therein. The flow guide 106 defines a plurality of channels 108. The channels 108 may be linear and extend from the side 96 towards the side 98. An inlet passage 110 supplies hydrogen to the coolant flow field 92 and an outlet passage 112 returns hydrogen to the return port 102. The flow guide 106 may include a portion disposed against the MEA to provide an electrical connection between the anode plate 76 and the MEA.

The outer frame 94 may also define a coolant inlet port 116 disposed on side 96 and a coolant return port 118 disposed on the side 98. The coolant flow field 90 receives coolant from the supply port 116, circulate the coolant across the bipolar plate, and returns the coolant to the return port 118. The coolant flow field 90 may include a plurality of channels configured to convey the coolant. The coolant may be an ethylene glycol mixture or other coolant formula. In the illustrated embodiment, the back side 88 defines a back pocket 120 configured to receive a coolant flow guide 122 therein. The coolant flow guide 122 may define a plurality of channels 124 that extend from the inlet side to the outlet side of the pocket 120. An inlet passage 126 and an outlet passage 128 fluidly connect the supply and return ports 116, 118 with the coolant flow field 90.

The anode plate 78 and the flow guides 106 and 122 may be formed of graphite composite material or metal. In some embodiments, the anode plate 78 and the flow guides 106 and 122 are formed of the same type of material. For example, anode plate 78 and the flow guides 106 and 122 may be formed of graphite, or the anode plate 78 and the flow guides 106 and 122 may be formed of an electrically conductive composite. The composite may include carbon power and a binder.

Figure 5A:
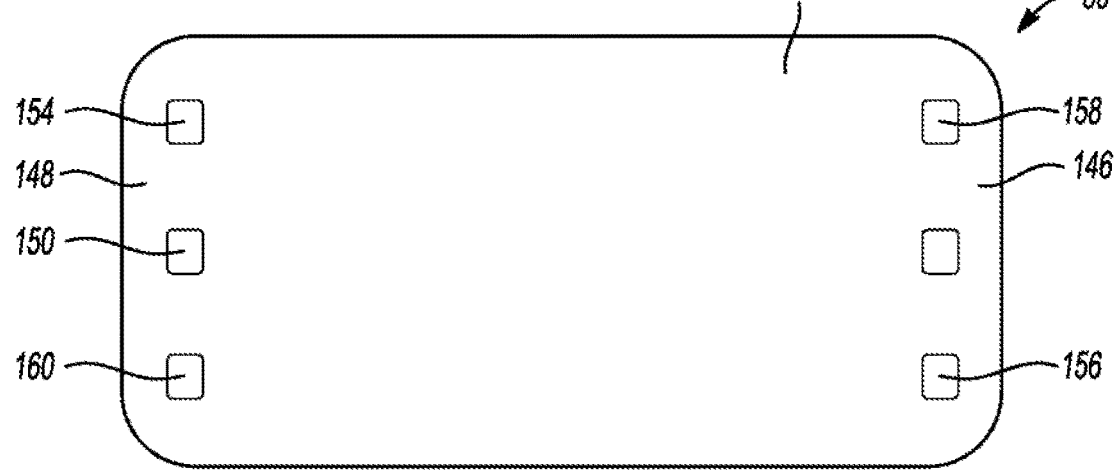
FIG. 5a is a back view of a cathode plate showing the oxidant flow side.
Figure 5B:
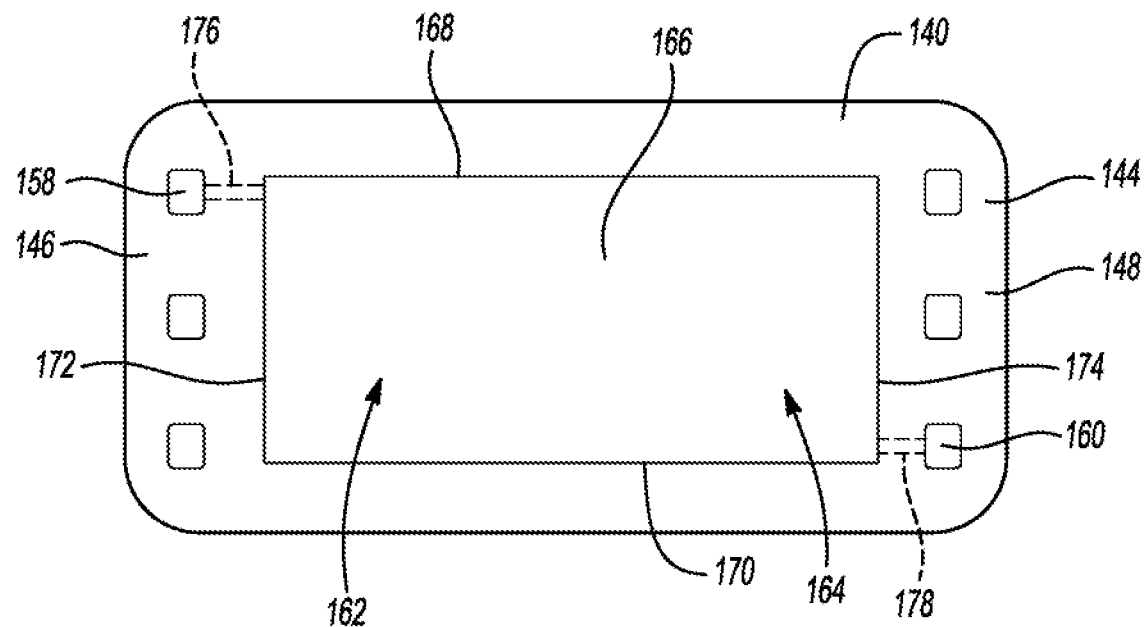
FIG. 5b is a front view of a cathode plate showing the coolant flow side.

Referring to FIGS. 5A and 5B, the cathode plate 80 may include front side 140 and back side 142. When the bipolar plate 24 is assembled the back side 142 of the cathode plate 80 is disposed against the back side 88 of the anode plate 78. The back side 142 of the cathode plate 80 may be flat and planar. The back side 142 covers over the coolant flow field 90 and cooperates with the anode plate 78 to fully define the coolant flow field 90, which is located in the middle of the bipolar plate 74.

The front side 140 of the cathode plate 80 is disposed against the cathode side of the MBA 76. The cathode plate 80 includes an outer frame 144 that is outside of the reactant area of the fuel cell. The outer frame 144 may include opposing sides 146 and 148 that define a plurality of ports for the coolant, the hydrogen, and the air. The ports of the cathode plate 80 align with the ports of the anode plate 78. The MBA 76 also includes coolant, hydrogen, and air ports that are aligned with the ports of the cathode plate and the anode plate. The ports of the unit cells 72 are all aligned to create coolant, hydrogen, and air headers that extend the along the length of the stack. Seals may be provided between the frames of the bipolar plates to prevent leaking of the headers. The seals may be elastomeric or silicone. In one embodiment, the seals may be Polytetrafluoroethylene (PTFT).

For example, a hydrogen supply port 150 is defined in the side 148, and a hydrogen return port 152 is defined in the side 148. A coolant supply port 154 is defined in the side 148, and a coolant return port 156 is defined in the side 146. An air supply port 158 is defined in the side 146 and an air return port 160 is defined in the side 148.

An air flow field 162 is located on the front side 140 of the cathode plate 80 and is configured to circulate air over the reactant area of the cathode side of the MEA 76. The air flow field 162 may be located within a pocket 164 recessed into the front side 140 of the cathode plate. The pocket 164 may include a bottom 166, opposing top and bottom sidewalls 168, 170 and opposing left and right sidewalls 172, 174. (The terms top, bottom, right, left, etc., are for ease of description and do not limit the embodiments of this disclosure to any particular orientation.) The front side 140 of the cathode plate 80 is disposed against the cathode side of the MEA 76 so that the MEA 76 covers the pocket to enclose the air flow field 162. The air supplied by the air flow field 162 forms part of the chemical reaction of the fuel cell. The oxygen atoms in the air combine with the hydrogen ions to form water that is carried away by the airstream flowing through the air flow field 162.

The pocket 164 is in fluid communication with the air supply port 158 and the air return port 160. For example, an inlet passage 176 extends from the air supply port 158 and through the wall 172, and an outlet passage 178 extends from the air return port 160 through the wall 174. In the illustrated embodiment, air is supplied to the pocket 164 near the top and exits near the bottom, but this could be reversed. The depth of the pocket 164, measured from the outer surface of the frame 144 to the bottom 166, may be varied with the thickness of the flow guide. The depth may be set so that lands of the flow guide contact the MEA. The area of the pocket 164 may approximate the reactive area of the MEA 76. A flow guide (not shown) having air channels may be disposed within the pocket. This will be described in detail below.

The cathode plate 80 may be formed of graphite or composite materials. In some embodiments the anode plate 78 and the cathode plate 80 are formed of the same material. The cathode plate 80 may also be formed of the same material as the flow guides 106 and 122. In one embodiment, the anode plate 78, the cathode plate 80, and the flow guides 106, 122 are formed of graphite. Or, the anode plate 78, the cathode plate 80, and the flow guides 106, 122 may be formed of composite.

Figure 6:
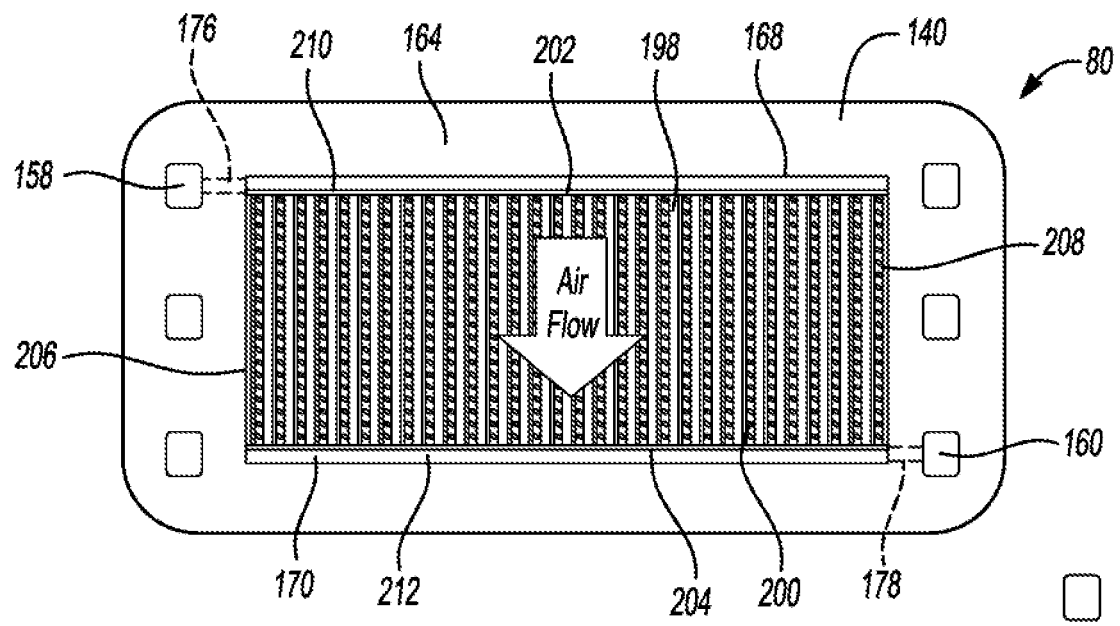
FIG. 6 is a front view of the cathode plate with a flow guide installed.
Figure 7:
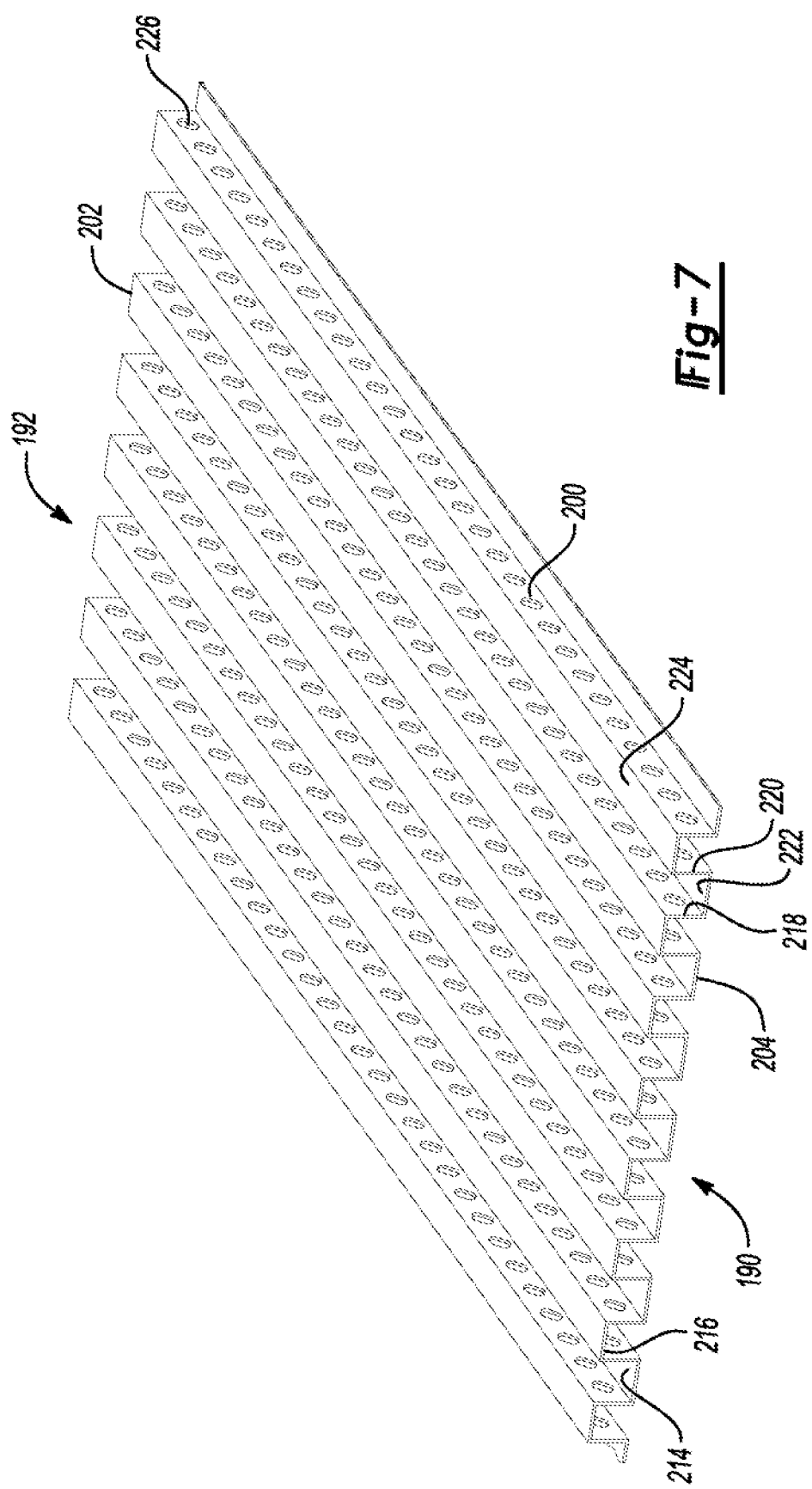
FIG. 7 is a perspective view of a flow guide according to an embodiment.

FIGS. 6 and 7 illustrate an example flow guide 200 disposed within the pocket 164 of the cathode plate 80. The flow guide 200 includes an inner side 190 facing the bottom 166 of the pocket 164 and an outer side 192 facing the MEA 76 when the fuel cell 20 is assembled. The flow guide 200 defines channeling 198 configured to circulate the air. The flow guide 200 is designed to circulate air on both the inner side 190 and the outer side 192. In the illustrated embodiment, the channeling 198 is linear and is oriented to circulate air from the top towards the bottom. The flow guide 200 may include a top edge 202, a bottom edge 204, and opposing side edges 206 and 208. The width of the flow guide 200 (distance between edges 202 and 204) may be less than the width of the pocket (distance between sidewalk 168, 170) to form an upper gap and a lower gap. The upper gap serves as an inlet manifold 210 that receives air from the inlet passage 176. The lower gap serves as an outlet manifold 212 that collects air and water prior to circulation to the outlet passage 178. During operation of the fuel cell 70, high pressure develops in the inlet manifold 210 causing the air to circulate down through the channeling 198 and subsequently into the outlet manifold 212. The length of the flow guide 200 (between edges 206 and 208) may approximate the length of the pocket 164.

The flow guide 200 may be formed as a corrugated metal plate. The metal plate may be made of a corrosion-resistance metal such as stainless steel, titanium, or aluminum alloy. The metal plate may have a corrosion resistant coating. That is, the flow guide 200 may be formed of a material that is different than the material of the cathode plate 80. The metal plate may have a thickness of 0.10 to 0.20 millimeters (mm) prior to forming, and once formed, may have a final thickness between 0.2 mm to 1.0 mm. The corrugations may be rectangular (as shown), wavy, or trapezoidal. The corrugations define the channeling 198. The channeling 198 may be on both the inner side 190 and on the outer side 192 of the flow guide 200. The channeling 198 may define concave channels 214 extending across the outer side 192 and convex channels 216 extending across the inner side 190. The channels 214, 216 may each include opposing side walls 218 and 220 that are interconnected by either an inner land 222 or and outer land 224 depending upon the channels being concave or convex. The channeling 198 may be substantially perpendicular to the first and second edges 202, 204. Substantially perpendicular means within plus or minus 3 degrees of perpendicular.

Figure 8:
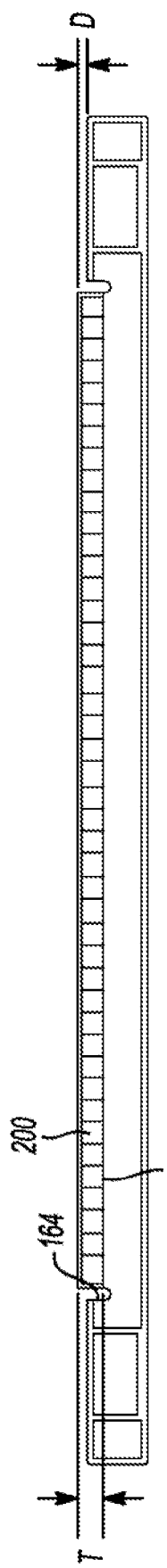
FIG. 8 is a cross-sectional view of the cathode plate.

Referring to FIG. 8, the flow guide 200 has a thickness (T) that is measured from the inner-most surface to the outer-most surface, e.g., the distance from the inner lands 222 to the outer lands 224. Since the flow guide 200 is formed of metal, the flow guide 200 has resiliency and can be urged from a resting state to a compressed state. In the resting state, the thickness of the now guide 200 is greater than the depth of the pocket 164 so that the flow guide projects outwardly from the cathode plate 80 by a distance (D). The distance D may be between 0.05 mm and 0.3 mm. This causes the flow guide 200 to be compressed between the MEA 76 and the bottom 166 of the pocket to ensure sufficient contact between the gas diffusion layer of the MEA and the outer lands 224. In other embodiments, the thickness (T) of the flow guide 200 may approximate or be less than the depth of the pocket 164.

Referring back to FIG. 7, the flow guide 200 may define a plurality of openings 226 connecting the convex channels 216 and the concave channels 214 in fluid communication so that air and/or water can pass through the flow guide 200. The inclusion of the openings 226, in conjunction with the channels on the inner side 190 and outer side 192, creates what may be referred to as a 3D flow field as the water is able to not only flow across the front and the back but also through the flow guide 200. The 3D nature of the flow field 162 created by the flow guide 200 increases uniformity of the air and water flow, which may reduce the probability of water blockage. During operation of the fuel cell, water tends to condense more against the bottom 166 of the pocket as it is adjacent to the coolant flow field 90. The openings 226 promote water to travel to the dryer outer side 192 to more evenly distribute the water within the flow field 162 and help reduce water blockages.

In the illustrated embodiment of FIG. 7, the openings 226 are defined in the sidewalk 218. But, in other embodiments, the openings may be defined in the inner lands 222, the sidewalls, 220, and/or in the outer lands 224. In other embodiments, openings may be defined in both lands and sidewalls. For example, the openings may be defined in the outer lands 224 and one or more of the sidewalk 218, 220 or in the inner lands 224 and one or more of the sidewalls 218, 220. The openings may be holes, slits, slots or other suitable shape. In some embodiments, the openings 226 may be uniform and of the same type, but, in other embodiments, multiple different types of openings may be provided on the flow guide.

Figure 9:
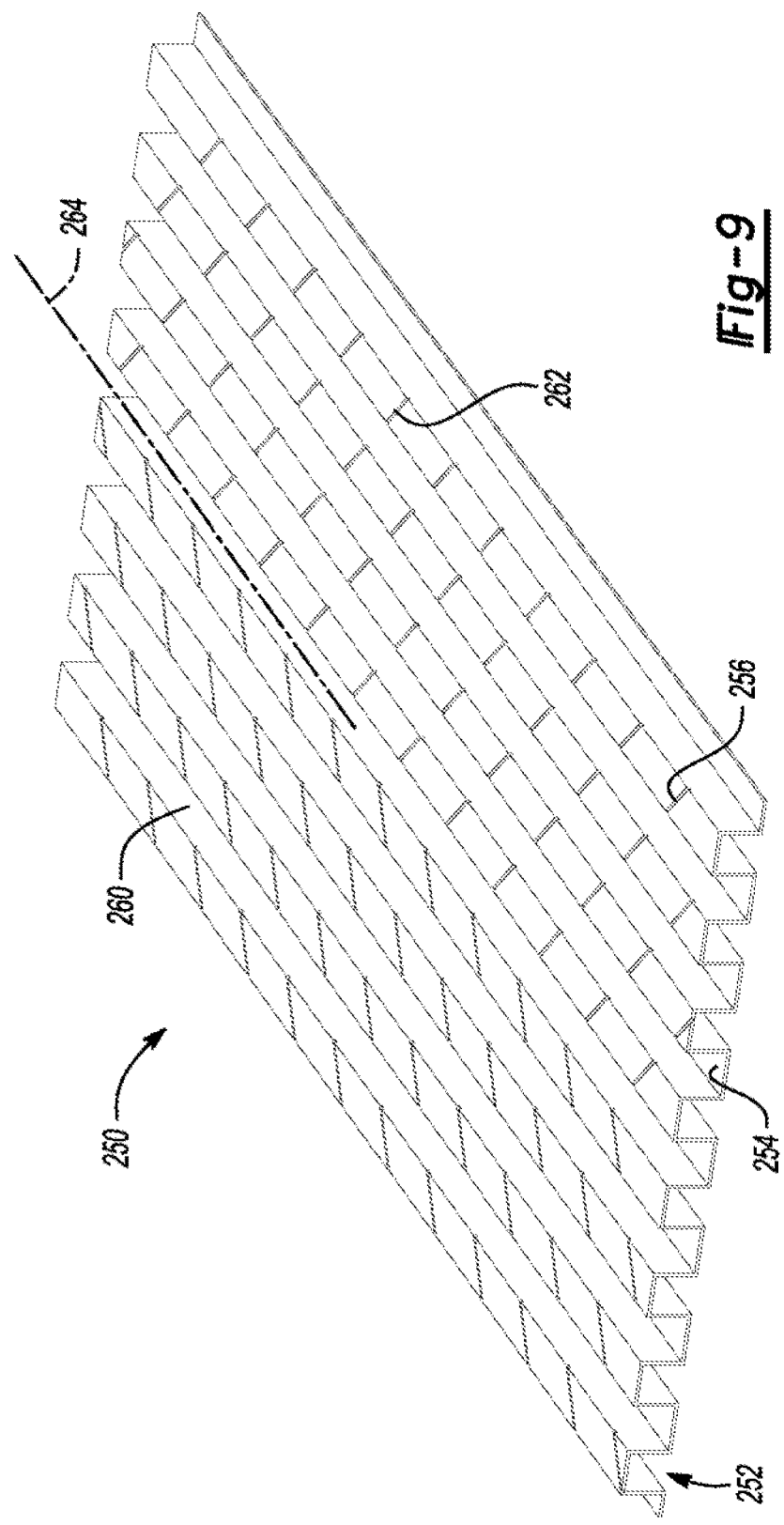
FIG. 9 is a perspective view of a flow guide according to another embodiment.

FIG. 9 illustrates another flow guide 250 that may be used in the cathode plate 80. The flow guide 250 may also be a corrugated metal flow guide having convex and concave channels 252, 254 that extend between the opposing edges. The flow guide 250 includes openings in the form of slits 256. The slits 256 may extend through the outer lands and/or the sidewalls of the channels. The slits may have a width of between 0.05 mm to 0.2 mm and a length of 3.0 mm to 20.0 mm. The slits 256 may be spaced apart by 0.2 mm to 1.0 mm. The slits may be angled at an oblique angle relative to the direction of the channels. For example, the slits 256 may be angled between 10° to 45° relative to of the centerlines of the channels.

The slits 256 may be arranged in sections in which the slits extend in a common direction. The illustrated flow guide 250 includes at least a first section 260 in which the slits have a first orientation and a second section 262 in which the slits have a second orientation. The first and second orientations may be mirrored over a line 264 as shown in FIG. 9. The orientations and slit sizes may vary with the area of cathode flow field to tune the systems for optimal performance.

Figure 10:
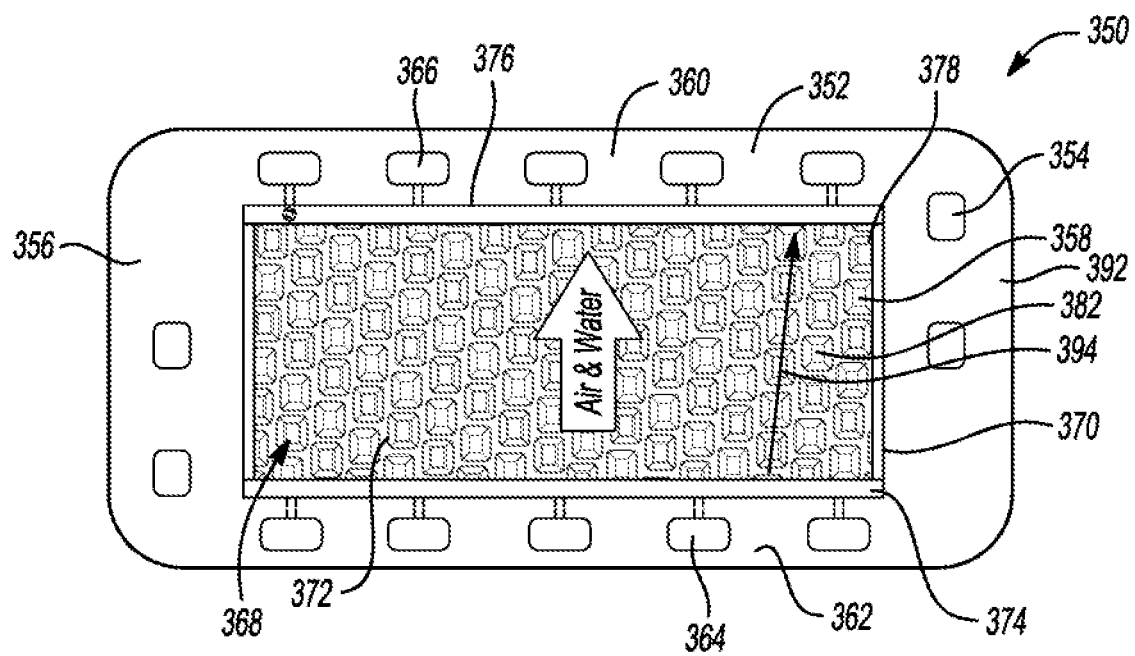
FIG. 10 is a front view of another cathode plate.

FIG. 10 shows another cathode plate 350 that may be used in a modified version of the bipolar plate 74. The cathode plate 350 may include a front side 352 and a back side (not visible). The back side of the cathode plate 350 is disposed against the back side of the anode plate as described above. The front side 352 of the cathode plate 350 is disposed against the cathode side of the MEA. The cathode plate 350 includes an outer frame 354 that is outside of the reactant area of the MEA. The outer frame 354 may include opposing sides 356 and 358 that define a plurality of ports for the coolant and the hydrogen. A top 360 and a bottom 362 of the frame 354 may each define a plurality of air ports with the air supply ports 364 being on the bottom 362 and the air return ports 366 being at the top 360. Alternatively, the air ports could be disposed on the right and left sides 356, 358 like the cathode plate 360. The ports of the cathode plate 350 align with the ports of the anode plate and the MEA to create coolant, hydrogen, and air headers that extend the along the length of the fuel-cell stack.

An air flow field 368 is located on the front side 352 of the cathode plate 350 and is configured to circulate air over the reactant area of the cathode side of the MEA. The airflow field 368 may be located within a pocket 370 recessed into the front side of the plate. The pocket 370 may be the same or similar to the pocket 364.

Figure 11:
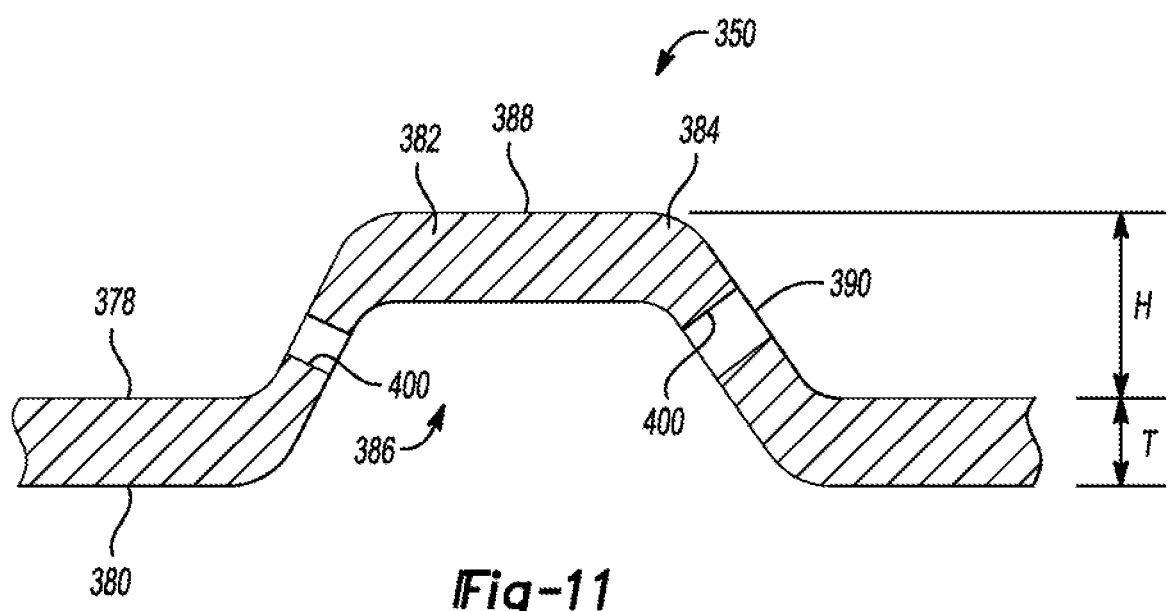
FIG. 11 is a side view of an embossment of a flow guide of the cathode plate of FIG. 10.

Referring to FIGS. 10 and 11, a flow guide 372 may be disposed in the pocket 370 such that an inlet manifold 374 and an outlet manifold 376 are formed. During operation, air flows over a front side 378 and a back side 380 of the flow guide 372 similar to above. Rather than having channeling, the flow guide 372 includes a plurality of embossments 382 raised from the front side 378 and recessed into the back side 380. Each of the embossments 382 creates a projection 384 raised from the front side 378 and a depression 386 recessed into the back side 380. Each of the embossments 382 also includes a top 388 and a plurality of sidewalk 390 extending between the front side 378 and the top 388.

The flow guide 372 may have a plate thickness (T) between 0.1 mm to 0.3 mm, and the embossments may have a height (H) between 0.2 mm to 2.0 mm. The shape of the embossments 382 may be rectangular (as shown), wedged, circular, elliptical, triangular, trapezoidal, arrow, hexagonal, or any other polygonal shape. The embossments 382 are arranged in a pattern to optimize the flow rate and uniformity of the flow field 368. This disclosure contemplates many different patterns of the embossments 382. For example, the embossments 382 may be arranged in rows to roughly create linear channels extending from the inlet manifold 374 to the outlet manifold 376. In the illustrated embodiment, the embossments 382 are arranged in angled rows 392 to roughly define angled channels 394. The embossments in adjacent rows are offset to increase turbulence in the airstream of the air flow field 368.

Figure 12:
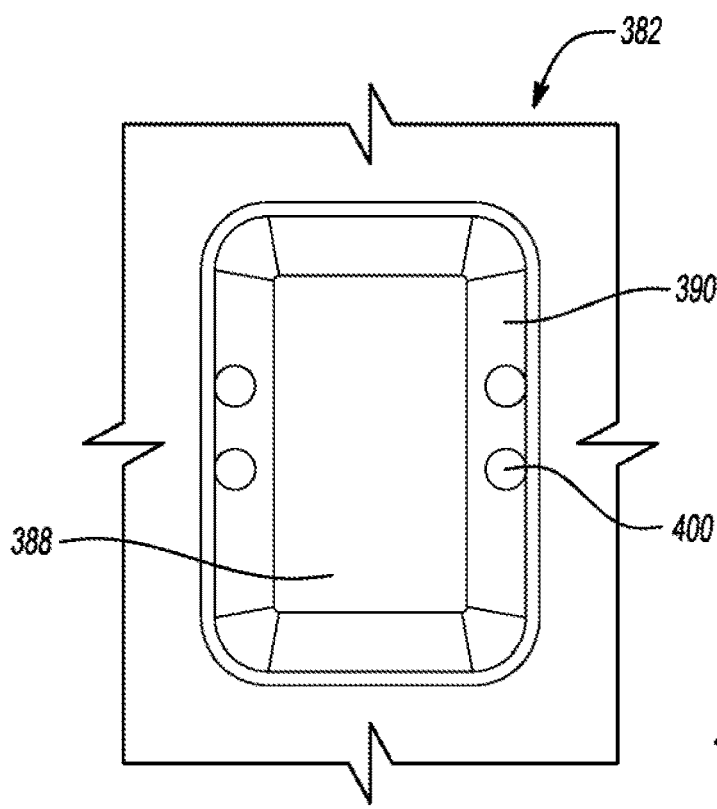
FIG. 12 is a detail view of an embossment having holes.

Referring to FIG. 12, in some embodiments, openings 400 may be defined in the embossments 382 to connect the front side 378 and the back side 380 in fluid communication. The openings 400 function much like the above-described openings 226. The openings 400 may be circular holes, elongated slots, slits, or any other type of opening. The openings 400 may be provided on the top 388, on the sidewalk 390, or combinations thereof. The embossments 382 may include a single opening or a plurality of openings. In some embodiments, the flow guide 350 may include embossments that have openings and others that do not have openings.

Figure 13:
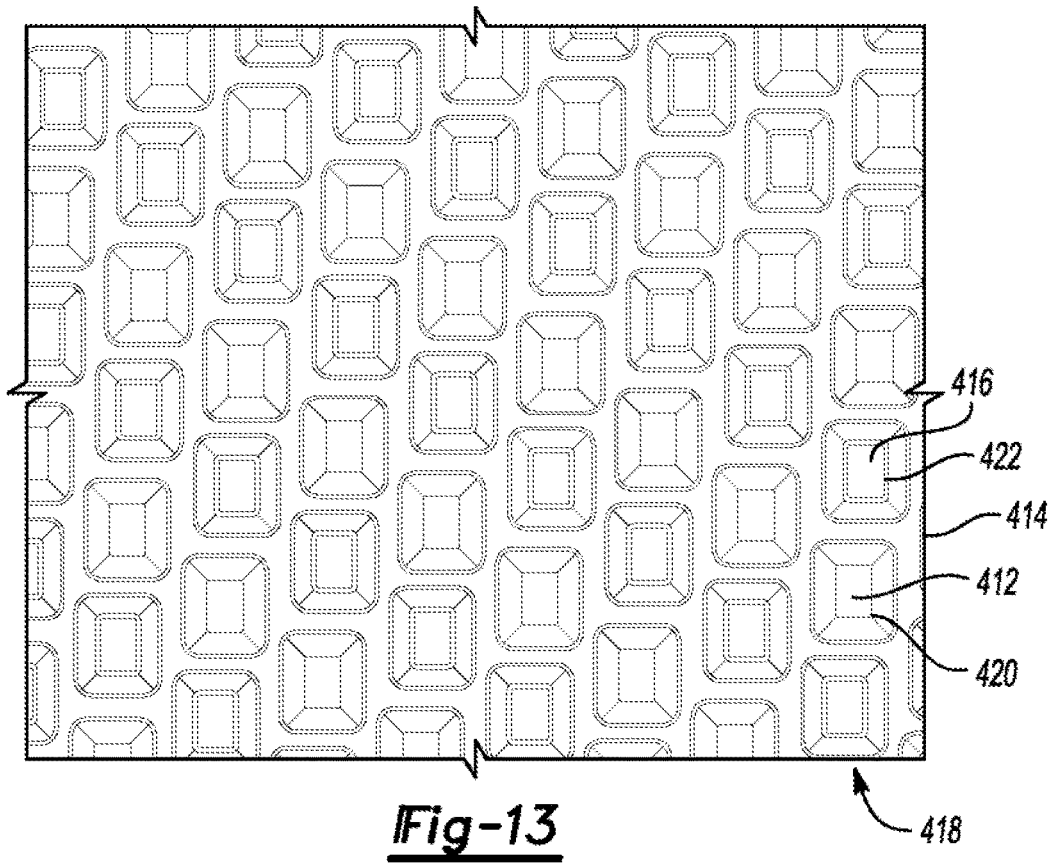
FIG. 13 is a front view of a flow guide according to another embodiment.

Referring to FIG. 13, in another flow guide 410, the embossments may project from both the front and the back of the flow guide. For example, the flow guide 410 includes a first set of embossments 412 that project from the front side 414 and a second set of embossments 416 that project from the back side. The embossments may be arranged in rows 41$ such that the first set 412 and the second set 414 of embossments alternate along the length of the row. This creates a series of projections 420 and depressions 422 along the length of the row. The exact arrangement of the first and second sets of embossments 412, 416 may vary to optimize the flow guides for particular applications.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system at tributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A bipolar plate for a fuel cell comprising:
an anode plate having hydrogen flow channels on a first side of the anode plate and coolant channels on a second side of the anode plate;
a cathode plate having a first side disposed against the second side of the anode plate to cover the coolant channels and having a second side defining a recessed pocket configured to receive a stream of air; and
a flow guide disposed in the pocket such that an inlet manifold is formed along a first edge of the flow guide and an outlet manifold is formed along a second edge of the flow guide, wherein the flow guide defines channels extending from the inlet manifold to the outlet manifold, and wherein a plurality of openings is defined by through the flow guide, wherein the channels include concave and convex channels, and wherein the openings connect between the concave and convex channels.

2. The bipolar plate of claim 1, where a resting height of the flow guide is greater than a depth of the pocket so that the flow guide is compressed when the bipolar plate is installed on the fuel cell.

3. The bipolar plate of claim 1, wherein each of the concave channels includes opposing sidewalls and a land extending between the sidewalls and disposed against a bottom of the pocket.

4. The bipolar plate of claim 1, wherein adjacent ones of the concave and convex channels share a sidewall, and wherein the openings are defined in the sidewalls so that the adjacent ones of the concave and convex channels are in fluid communication.

5. The bipolar plate of claim 1, wherein the concave and convex channels are substantially perpendicular to the first and second edges.

6. The bipolar plate of claim 1, wherein a width of the pocket is larger than a width of the flow guide to form the inlet and outlet manifolds.

7. The bipolar plate of claim 1, wherein the cathode plate is a carbon-based composite, and the flow guide is metal.

8. A bipolar plate for a fuel cell comprising:
an anode side having hydrogen channels;
a cathode side defining a recessed pocket;
coolant channels disposed between the anode side and the cathode side;
at least one air port in fluid communication with the pocket; and
a flow guide disposed in the pocket such that an inlet manifold is formed along a first edge of the flow guide and an outlet manifold is formed along a second edge of the flow guide, wherein the flow guide defines channels extending from the inlet manifold to the outlet manifold, and wherein a plurality of openings is defined through the flow guide, wherein the channels include concave and convex channels, and wherein the openings connect between the concave and convex channels.

9. The bipolar plate of claim 8, wherein a resting height of the flow guide is greater than a depth of the pocket so that the flow guide is compressed when the bipolar plate is installed on the fuel cell.

10. The bipolar plate of claim 8, wherein adjacent ones of the concave and convex channels share a sidewall, and wherein the openings are defined in the sidewalls so that the adjacent ones of the concave and convex channels are in fluid communication.

11. The bipolar plate of claim 8 further comprising:
an anode plate including the anode side; and
a cathode plate including the cathode side, wherein the anode plate and the cathode plate are attached to each other.

12. The bipolar plate of claim 8, wherein the cathode plate is a carbon-based composite, and wherein the flow guide is metal.

* * * * *